(12) United States Patent
Larsson et al.

(10) Patent No.: US 9,429,258 B2
(45) Date of Patent: Aug. 30, 2016

(54) CONNECTION ARRANGEMENT AND METHOD FOR ASSEMBLING THE SAME

(75) Inventors: Bengt Ingemar Larsson, Tingarod (SE); Marie Hakansson, Malmo (SE)

(73) Assignee: Wayne Fueling Systems Sweden AB, Malmo (SE)

( * ) Notice: Subject to any disclaimer, the term of this patent is extended or adjusted under 35 U.S.C. 154(b) by 0 days.

(21) Appl. No.: 13/809,395

(22) PCT Filed: Jul. 9, 2010

(86) PCT No.: PCT/EP2010/059925
§ 371 (c)(1),
(2), (4) Date: Jan. 9, 2013

(87) PCT Pub. No.: WO2012/003887
PCT Pub. Date: Jan. 12, 2012

(65) Prior Publication Data
US 2013/0113202 A1    May 9, 2013

(51) Int. Cl.
| | |
|---|---|
| *F16L 25/00* | (2006.01) |
| *F16L 19/025* | (2006.01) |
| *F16L 19/02* | (2006.01) |

(52) U.S. Cl.
CPC .......... *F16L 19/025* (2013.01); *F16L 19/0231* (2013.01); *Y10T 137/0447* (2015.04)

(58) Field of Classification Search
USPC ......... 285/390, 282, 330, 913, 67, 103, 325, 285/387, 388
See application file for complete search history.

(56) References Cited

U.S. PATENT DOCUMENTS

| | | | | |
|---|---|---|---|---|
| 1,054,812 | A * | 3/1913 | Zierath | 403/184 |
| 1,564,965 | A * | 12/1925 | Phillips | F16L 37/26 |
| | | | | 279/9.1 |
| 1,866,905 | A * | 7/1932 | Prompt | 285/79 |
| 2,195,492 | A * | 4/1940 | McDonald | 285/330 |
| 2,353,012 | A * | 7/1944 | Cheney | F16L 19/0231 |
| | | | | 285/332 |
| 2,419,702 | A * | 4/1947 | Barnes | 285/352 |
| 3,623,753 | A * | 11/1971 | Henry | 285/330 |
| 4,060,298 | A * | 11/1977 | Gearin | 439/289 |
| 4,397,484 | A * | 8/1983 | Miller | 285/81 |
| 4,821,818 | A * | 4/1989 | Mefferd | 175/323 |
| 5,066,051 | A * | 11/1991 | Weigl et al. | 285/328 |
| 5,082,391 | A * | 1/1992 | Florida | F16B 7/0426 |
| | | | | 285/184 |
| 5,163,721 | A * | 11/1992 | Babuder | 285/328 |
| 5,299,843 | A * | 4/1994 | Weigl et al. | 285/328 |

(Continued)

OTHER PUBLICATIONS

PCT, International Preliminary Report on Patentability, International Application No. PCT/EP2010/059925; International Filing Date: Jul. 9, 2010, 13 pages.

*Primary Examiner* — Aaron Dunwoody
(74) *Attorney, Agent, or Firm* — Mintz Levin Cohn Ferris Glovsky and Popeo, P.C.

(57) ABSTRACT

A connection arrangement is provided for mechanically and fluidly connecting a fuel filter to a fluid meter in a fuel dispenser, and a method is provided for assembly of the connection arrangement. The connection arrangement can include a first part, a second part and a filter holding part, all parts being connected along a common centre axis. The first part can include an outlet, a first connection interface, an inlet, and a second connection interface. The second part can include a third connection interface and a fourth connection interface. The filter holding part can include an outlet and a fifth connection interface. The second part can be adjustable to move the connection arrangement between an unlocked state and a locked state.

20 Claims, 4 Drawing Sheets

(56) References Cited

U.S. PATENT DOCUMENTS

| | | | |
|---|---|---|---|
| 5,474,334 A * | 12/1995 | Eppink | 285/184 |
| 5,714,062 A | 2/1998 | Winkler et al. | |
| 5,950,744 A * | 9/1999 | Hughes | 175/320 |
| 6,168,213 B1 * | 1/2001 | Muller | 285/391 |
| 6,267,417 B1 * | 7/2001 | Fan | 285/330 |
| 7,226,090 B2 * | 6/2007 | Hughes | 285/330 |
| 7,390,032 B2 * | 6/2008 | Hughes | 285/330 |
| 7,793,994 B2 * | 9/2010 | Boyd | 285/354 |
| 2005/0023831 A1 * | 2/2005 | Hughes | 285/330 |
| 2006/0175835 A1 * | 8/2006 | Kronmeyer | F16L 19/0231 285/387 |
| 2010/0117359 A1 * | 5/2010 | Herndon | F16B 37/0892 285/354 |
| 2014/0054886 A1 * | 2/2014 | Hughes et al. | 285/330 |

\* cited by examiner

CONNECTION ARRANGEMENT AND METHOD FOR ASSEMBLING THE SAME

TECHNICAL FIELD

The present invention relates to a connection arrangement for mechanically and fluidly connecting a fuel filter to a fluid meter in a fuel dispenser and to a method for assembling the connection arrangement,

BACKGROUND ART

Fuel dispensers comprise fluid meters to measure the amount of fuel pumped. The fluid meters are connected to fuel supply pipes via fuel filters. However, different fluid meters have different interfaces and do not always fit with the fuel filters. Therefore the connection interface of the fluid filter has to be supplied in many different versions, each to fit a particular fluid meter.

SUMMARY OF THE INVENTION

In view of the above, an objective of the invention is to solve or at least reduce one or several of the drawbacks discussed above. Generally, the above objective is achieved by the attached independent patent claims.

According to a first aspect, the present invention is realized by a connection arrangement for mechanically and fluidly connecting a fuel filter to a fluid meter in a fuel dispenser. The connection arrangement comprises: a first part, a second part and a filter holding part, all parts being connected along a common centre axis. Said first part comprises: an outlet for fluid communication with an inlet of said fluid meter, a first connection interface for mechanical connection to said fluid meter, an inlet for fluid communication with the filter holding part, and a second connection interface for mechanical connection to said second part. Said second part comprises: a third connection interface for mechanical connection to said second connection interface, and a fourth connection interface for mechanical connection to said filter holding part. Said filter holding part comprises: an outlet for fluid connection to said inlet of said first part, and a fifth connection interface for mechanical connection to said fourth connection interface. The second part is adjustable to move said connection arrangement between an unlocked state, in which said filter holding part is rotatable around said centre axis, and a locked state, in which the filter holding part is pressed against the first part and the filter holding part is prevented from rotating around said centre axis and has a sealed fluid connection to the first part.

Having a first, a second and a filter holding part with compatible interfaces is advantageous in that different types of fluid meters can be connected to a fluid filter. Even if different fluid meters have different types of inlets but are compatible with the first connection interface for mechanical connection to the fluid meter, they can be connected to different types of fuel filters using the first part, the second part, and the filter holding part. Furthermore, in the unlocked state, in which the filter holding part is rotatable around said centre axis, it is possible to rotate the filter holding part to a desired position before said connection arrangement is set in the locked state.

Said second connection interface may be a circular cylinder section of the first part having an external thread, and said third connection interface may be a circular tubular section of the second part having an internal thread.

This is advantageous in that it is easy to connect the first and second parts by screwing them together.

Said fifth connection interface may have projections and said second connection interface may have recesses, causing the rotational lock of said locked state as said filter holding part is pressed against said first part.

This is advantageous in that the fluid connection to the first part is sealed.

Said projections may fit with said recesses in certain angles around said centre axis between the parts while providing a rotational lock.

This is advantageous in that several positions around the centre axis are possible for the first part in view of the filter holding part.

The fifth connection interface may be a circular flange, and the fourth connection interface of the second part may have a recess in a cylinder wall of the second part for receiving the flange, so that the flange is prevented from moving along said centre axis and so that the filter part is rotatable around said centre axis when said connection arrangement is in its unlocked state.

This is advantageous in that the filter holding part is easily inserted into the second part through a sliding motion, and in that the second part is fixed in the axial direction once the connection arrangement is locked.

The space in fuel dispensers is usually limited why the embodiments presented above are advantageous since they provide for ease when connecting the first, second and filter holding part. E.g., the filter holding part may be pre-assembled with a fuel supply pipe. Then it is easy to switch between different fuel meters connected to a first part and a second part.

According to a second aspect, the present invention is realized by a method for assembling a connection arrangement for mechanically and fluidly connecting a fuel filter to a fluid meter in a fuel dispenser. The connection arrangement used in said method comprises a first part, a second part and a filter holding part, along a common centre axis. Said first part comprises: an outlet for fluid communication with an inlet of said fluid meter, a first connection interface for mechanical connection to said fluid meter, an inlet for fluid communication with the filter holding part, and a second connection interface for mechanical connection to said second part. Said second part comprises: a third connection interface for mechanical connection to said second connection interface, and a fourth connection interface for mechanical connection to said filter holding part. Said filter holding part comprises: an outlet for fluid connection to said inlet of said first part, and a fifth connection interface for mechanical connection to said fourth connection interface. The method comprises the steps of: connecting the third connection interface of the second part to the second connection interface of the first part, connecting the filter holding part to a fuel supply pipe, and connecting the fifth connection interface of said filter holding part to the fourth connection interface of the second part, establishing an unlocked state of said connection arrangement, in which said filter holding part is rotatable around said centre axis.

The filter holding part being rotatable is advantageous in that the filter holding part can be rotated into a desired position. Furthermore, having a first, a second and a filter holding part with compatible interfaces is advantageous in that different types of fluid meters can be connected to a fluid filter. Even if different fluid meters have different types of inlets but are compatible with the first connection interface for mechanical connection to the fluid meter, they can be connected to different types of fuel filters using the first part, the second part, and the filter holding part. Additionally, the space in fuel dispensers is usually limited why the method presented above is advantageous since it provides for ease when connecting the first, second and filter holding part. E.g., the first part may be connected to the second part and the filter holding part may be connected to the fuel supply pipe. This has the advantage that the filter holding part and the fuel supply pipe can be pre-assembled and then easily connected to different fuel meters through the first and second part.

The method may further comprise the steps of: adjusting the second part so that the filter holding part is pressed against the first part establishing a locked state, in which the filter holding part is pressed against the first part and the filter holding part is prevented from rotating around said centre axis and has a sealed fluid connection to the first part.

This is advantageous in that the fluid connection to the first part is sealed.

Said second connection interface may be a circular cylinder section of said first part having an external thread, and said third connection interface may be a circular tubular section of the second part having an internal thread, and wherein said step of adjusting may comprise screwing said threads together to accomplish that the filter holding part is pressed against the first part.

This is advantageous in that it is easy to connect the first and second parts by screwing them together.

Other objectives, features and advantages of the present invention will appear from the following detailed disclosure, from the attached claims as well as from the drawings.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

Other features and advantages of the present invention will become apparent from the following detailed description of a presently preferred embodiment, with reference to the accompanying drawings, in which.

DETAILED DESCRIPTION OF PREFERRED EMBODIMENTS OF THE INVENTION

The present invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout.

Figure 1:
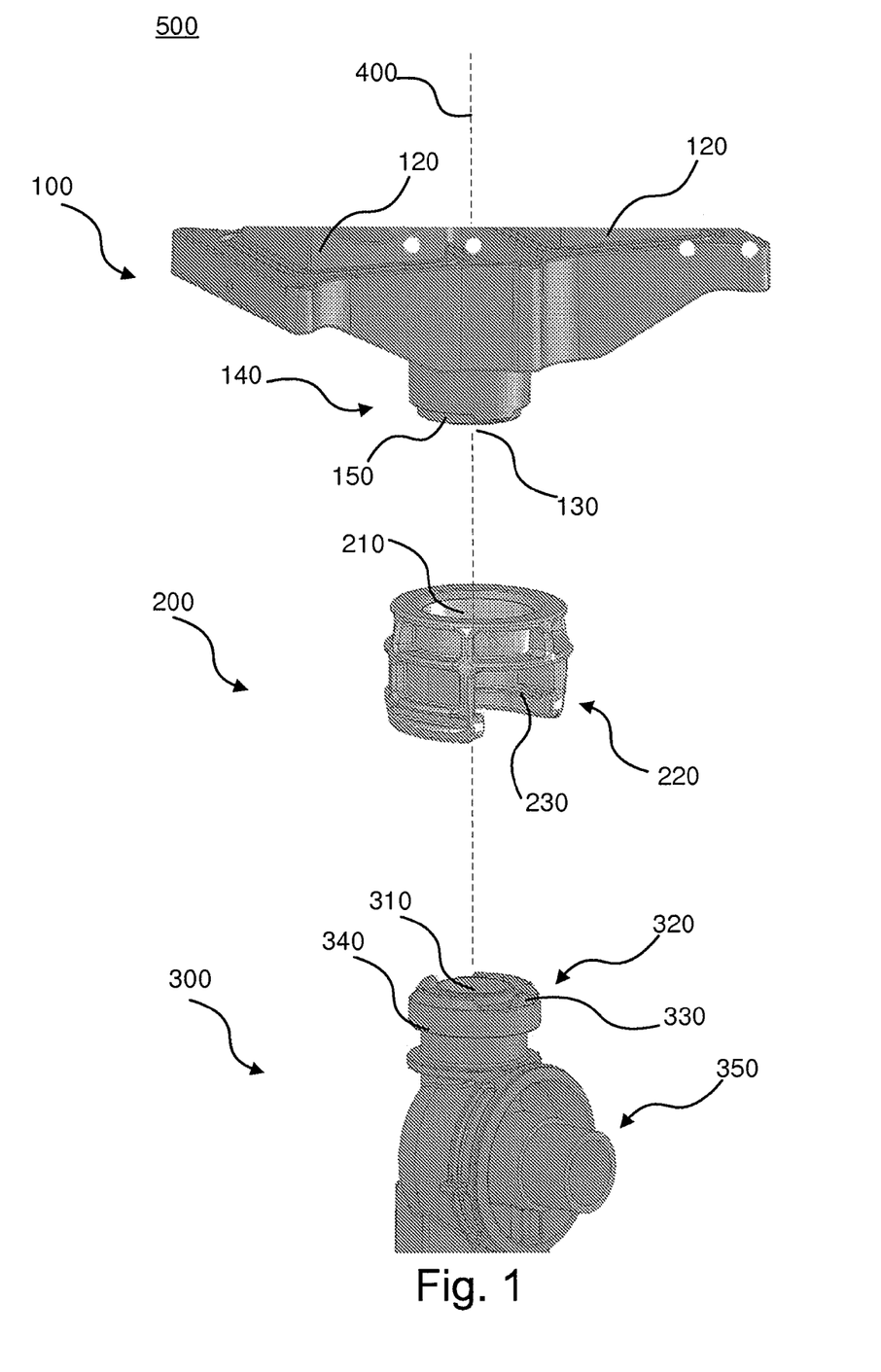
FIG. 1 is an exploded view of a connection arrangement according to the invention.

FIG. 1 discloses an exploded view of a connection arrangement 500. The connection arrangement 500 comprises a first part 100, a second part 200 and a filter holding part 300. Also disclosed is a centre axis 400 illustrating the centres of the first part 100, the second part 200 and the filter holding part 300. The first part 100 will in the following be referred to as the meter connector part 100 and the second part 200 will in the following be referred to as the intermediate connector part 200.

Figure 3:
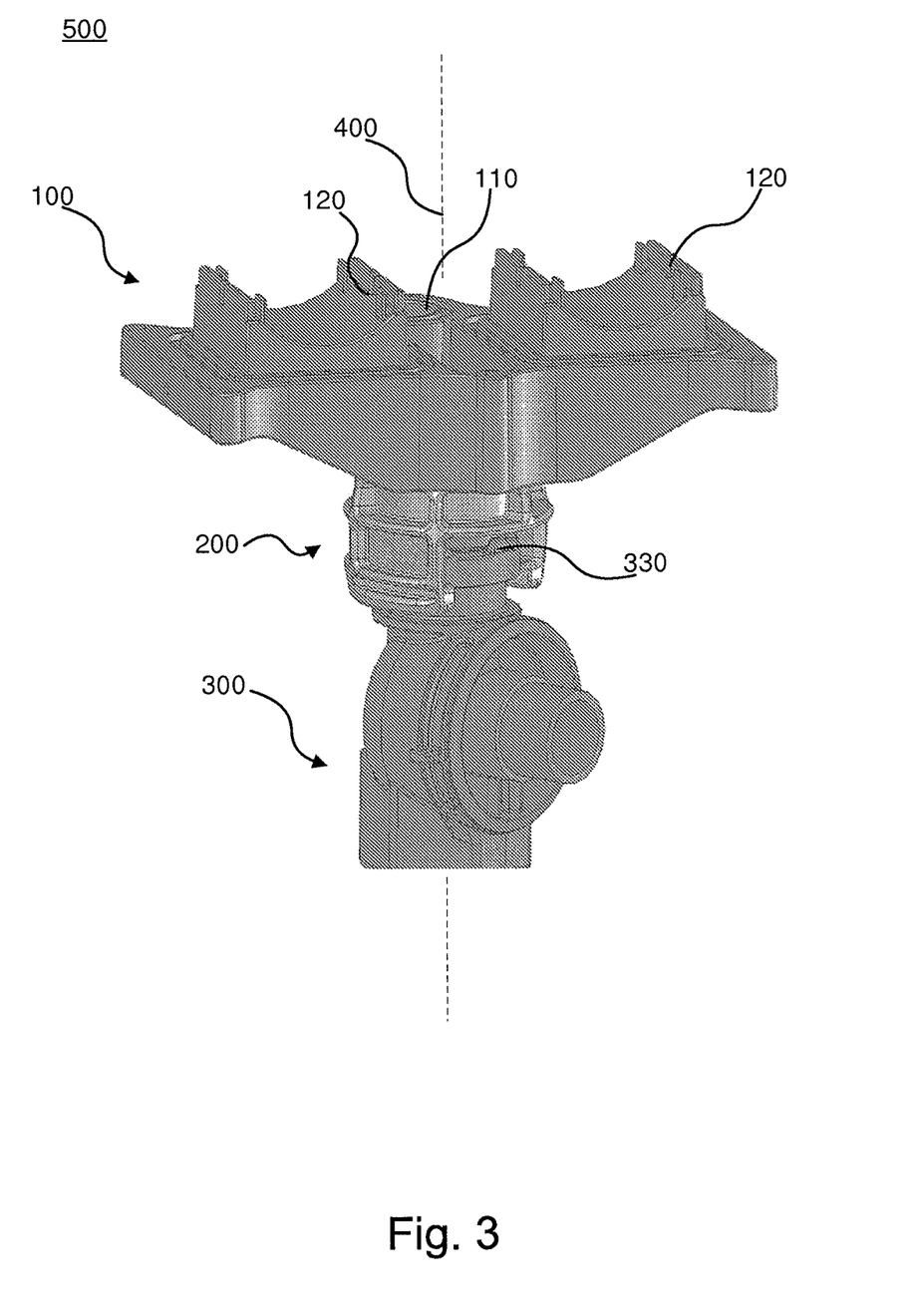
FIG. 3 is a perspective view of the connection arrangement of FIG. 1, wherein all parts of the connection arrangement are connected.

The meter connector part 100 comprises an outlet 110 for fluid communication with an inlet of a fluid meter (not shown) and a first connection interface 120 for mechanical connection to the fluid meter. The outlet 110 is illustrated in FIG. 3. It is to be understood that the outlet 110 and the first connection interface 120 illustrated in the drawings is one way to realize the outlet 110 and the first connection interface 120. The skilled person understands that various realizations are possible. The specific design of these parts will be adapted to the fluid meter in question.

The meter connector part 100 further comprises an inlet 130 for fluid communication with the filter holding part 300, and a second connection interface 140 for mechanical connection to the intermediate connector part 200.

The intermediate connector part 200 comprises a third connection interface 210 for mechanical connection to the second connection interface 140, and a fourth connection interface 220 for mechanical connection to the filter holding part 300.

The filter holding part 300 comprises an outlet 310 for fluid connection to the inlet 130 of the meter connector part 100, and a fifth connection interface 320 for mechanical connection to the fourth connection interface 220. A fuel filter (not shown) can be connected to the filter holding part 300 via a filter connection interface 350.

The second connection interface 140 is a circular cylinder section of the meter connector part 100 having an external thread (not shown), and the third connection interface 210 is a circular tubular section of the intermediate connector part 200 having an internal thread (not shown). The meter connector part 100 and the intermediate connector part 200 can be screwed together through the external thread and the internal thread.

The fifth connection interface 320 has projections 330 and the second connection interface 140 has recesses 150. The projections 330 fit with the recesses 150 in certain angles around the centre axis 400.

The fifth connection interface 320 is a circular flange 340, and the fourth connection interface 220 has a recess 230 in a cylinder wall of the intermediate connector part 200 for receiving the flange 340. When fitted in the recess 230, the flange 340 is prevented from moving along the centre axis 400.

Figure 2:
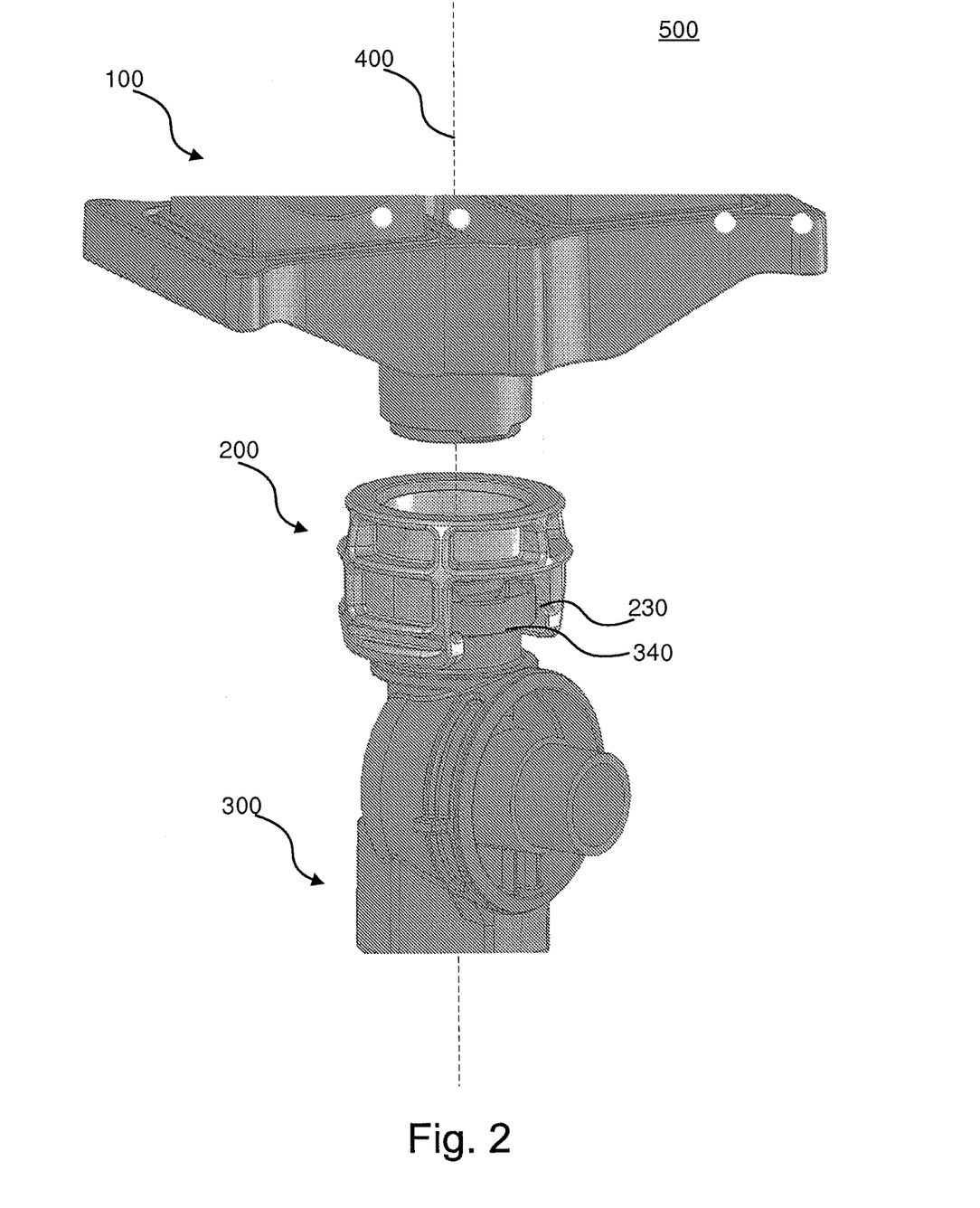
FIG. 2 is a perspective view of the connection arrangement of FIG. 1, wherein the second part and the filter holding part are connected.

FIG. 2 discloses the connection arrangement 500 of FIG. 1 with the intermediate connector part 200 and the filter holding part 300 fitted together. The flange 340 has been fitted in the recess 230. Flange 340 is prevented from moving along the centre axis 400. However, the filter holding part 300 is rotatable around said centre axis 400.

Figure 4:
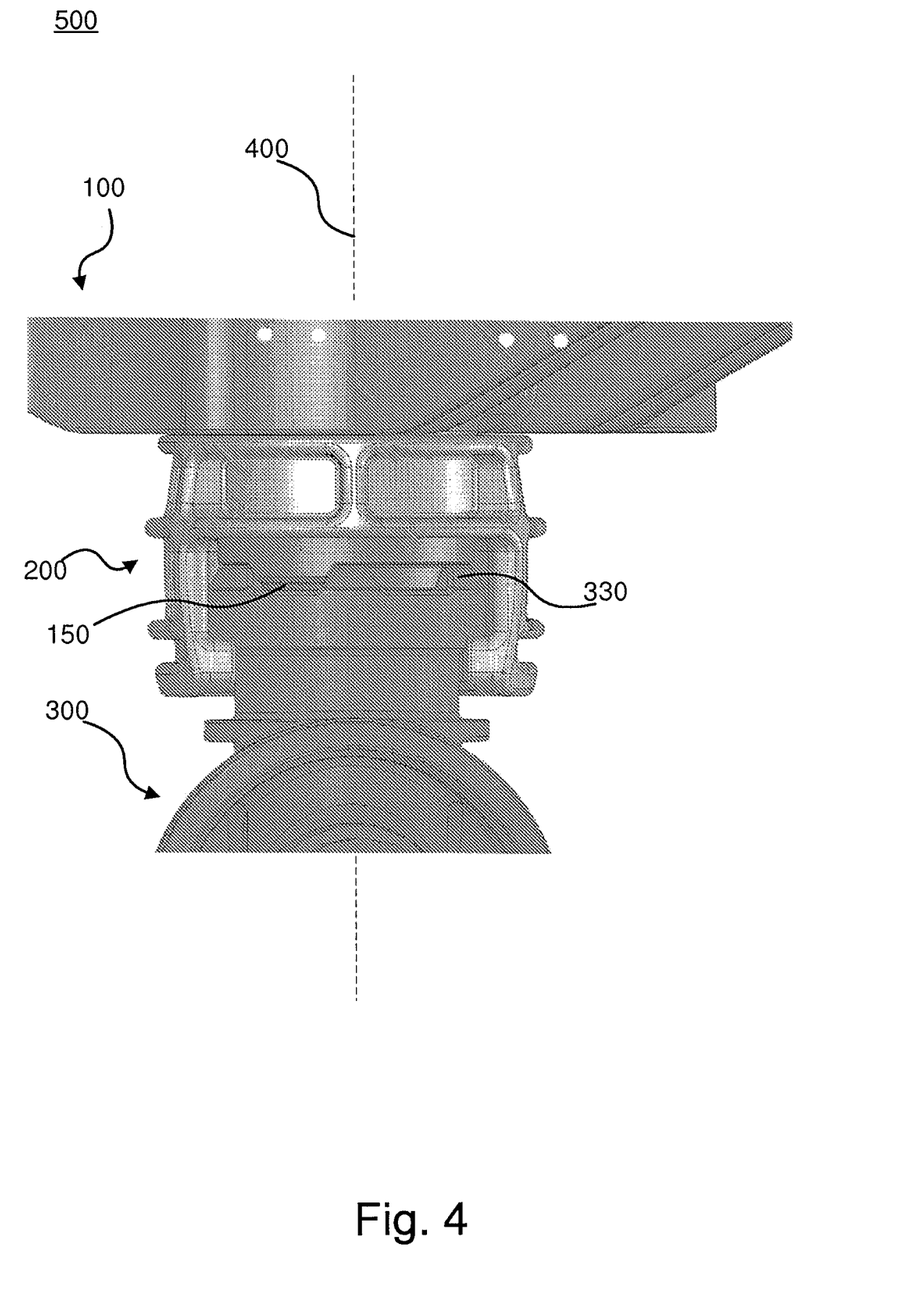
FIG. 4 is a front view of the connection arrangement of FIG. 3.

FIG. 3 discloses the connection arrangement 500 of FIG. 1 and FIG. 2 with the meter connector part 100, the intermediate connector part 200 and the filter holding part 300 fitted together. A front view of the connection arrangement 500 of FIG. 3 is illustrated in FIG. 4. The projections 330 have been fitted with the recesses 150 around the centre axis 400 providing a rotational lock. The intermediate connector part 200 and the meter connector part 100 have been screwed together. The filter holding part 300 is pressed against the meter connector part 100. This is the locked state of the connection arrangement 500.

The intermediate connector part 200 is adjustable to move the connection arrangement 500 between an unlocked state and a locked state. In the unlocked state, the filter holding part 300 is rotatable around the centre axis 400 and the intermediate connector part 200 and the meter connector part 100 have not been fully screwed together. In the locked state, the intermediate connector part 200 and the meter connector part 100 have been screwed together so that the filter holding part 300 is pressed against the meter connector part 100 and the filter holding part 300 is prevented from rotating around the centre axis 400 and has a sealed fluid connection to the meter connector part 100.

In the following, the inventive method for assembling the connection arrangement 500 will be explained with reference to FIG. 1-4. The third connection interface 210 of the intermediate connector part 200 is connected to the second connection interface 140 of the meter connector part 100 by screwing the intermediate connector part 200 onto the second connection interface 140 only part-way.

The filter holding part 300 is connected to a fuel supply pipe in any suitable manner known to the skilled person.

The fifth connection interface 320 of said filter holding part 300 is connected to the fourth connection interface 220 of the intermediate connector part 200 by sliding the fifth connection interface 320 laterally into the fourth connection interface 220, establishing an unlocked state of the connection arrangement 500, in which the filter holding part 300 is rotatable around the centre axis 400.

The intermediate connector part 200 may be adjusted so that the filter holding part 300 is pressed against the meter connector part 100 by screwing the intermediate connector part 200 all the way onto the second connection interface 140, thereby establishing a locked state, in which the filter holding part 300 is pressed against the meter connector part 100 and the filter holding part 300 is prevented from rotating around the centre axis 400 and has a sealed fluid connection to the meter connector part 100.

The second connection interface 140 can be a circular cylinder section of the meter connector part 100 having an external thread, and the third connection interface 210 can be a circular tubular section of the intermediate connector part 200 having an internal thread. The step of adjusting can then, as described above, comprise screwing said threads together to accomplish that the filter holding part 300 is pressed against the first part 100.

The skilled person realises that a number of modifications of the embodiments described herein are possible without departing from the scope of the invention which is defined in the appended claims.

For instance, the connection between the second connection interface 140 of the meter connector part 100 and the third connection interface 210 of the intermediate connector part 200 need not necessarily be via screw threads. Instead, a bayonet coupling could be used.

Once the connection arrangement 500 is connected and locked, a filter connected to the filter connection interface 350 may be used to further secure the connection arrangement by fixing the filter, thereby preventing rotation and/or axial movement of the filter and, hence, the connection arrangement.

The meter connector part may have different first connection interfaces adapted to different kinds of fluid meters, while the second connection interface may be kept the same, regardless of the kind of fluid meter, thereby affording a certain standardisation.

Further, the intermediate connector part need not be a separate part, but could be attached to the meter connector part, as long as such attachment allows the intermediate connector part to be switched or moved from the unlocked state to the locked state.

The projections and recesses of the second connection interface and the fifth connection interface may have any desired shape, as long as they ensure a rotational locking.

The engagement between the second connection interface and the fifth connection interface need not necessarily be direct. Instead, the recesses of the second connection interface could engage projections on the inside of the intermediate connector part, whereas the projections of the fifth connection interface could engage recesses on the inside of the intermediate connector part.

The invention claimed is:

1. A connection arrangement for mechanically and fluidly connecting a fuel filter to a fluid meter in a fuel dispenser, the connection arrangement comprising:
   a first part;
   a second part; and
   a filter holding part, all of the first, second, and filter holding parts being connected along a common centre axis; wherein:
   said first part comprises:
      an outlet for fluid communication with an inlet of said fluid meter,
      a first connection interface for mechanical connection to said fluid meter,
      an inlet for fluid communication with the filter holding part, and
      a second connection interface for mechanical connection to said second part;
   said second part comprises:
      a third connection interface for mechanical connection to said second connection interface, and
      a fourth connection interface for mechanical connection to said filter holding part;
   said filter holding part comprises:
      an outlet for fluid connection to said inlet of said first part, and
      a fifth connection interface for mechanical connection to said fourth connection interface;
   the second part is adjustable to move said connection arrangement between an unlocked state, in which said filter holding part is rotatable around said centre axis, and a locked state, in which the filter holding part is pressed directly against the first part and the filter holding part is prevented from rotating around said centre axis and has a sealed fluid connection to the first part;
   the second part has an opening formed through a sidewall thereof, the filter holding part being configured to be advanced into the opening in a direction toward the centre axis so as to mechanically connect the fifth connection interface to the fourth connection interface; and
   said fifth connection interface has projections and said second connection interface has recesses, causing the rotational lock of said locked state as said filter holding part is pressed against said first part.

2. The connection arrangement according to claim 1, wherein said second connection interface is a circular cylinder section of the first part, and said third connection interface is a circular tubular section of the second part.

3. The connection arrangement according to claim 1, wherein said projections fit with said recesses in certain angles around said centre axis between the parts while providing a rotational lock.

4. The connection arrangement according to claim 1, wherein the fifth connection interface is a circular flange, and the fourth connection interface of the second part has the opening in a cylinder wall of the second part for receiving the flange, so that the flange is prevented from moving along said centre axis and so that the filter holding part is rotatable around said centre axis when said connection arrangement is in its unlocked state.

5. The connection arrangement according to claim 1, wherein the fourth connection interface includes a cylindrical sidewall, and the opening extends through the cylindrical sidewall.

6. The connection arrangement according to claim 1, wherein the fourth connection interface has a C-shaped cross-sectional shape.

7. The connection arrangement according to claim 1, wherein the advancing of the filter holding part into the opening comprises sliding the filter holding part relative to the second part along an axis that is angularly offset from the centre axis.

8. The connection arrangement according to claim 1, wherein, when the connection arrangement is in the locked state, a first engagement surface of the filter holding part is pressed against a second engagement surface of the first part and the first and second engagement surfaces are visible from outside the connection arrangement through empty space defined by the opening.

9. The connection arrangement according to claim 1, wherein, when the connection arrangement is in the locked state, the projections and the recesses are visible from outside the connection arrangement through empty space defined by the opening.

10. The connection arrangement according to claim 1, wherein in the locked state, the filter holding part being pressed against the first part includes the fifth connection interface of the filter holding part directly contacting and pressing against the second connection interface of the first part.

11. The connection arrangement according to claim 1, wherein the projections are seated in the recesses in the locked state and in the unlocked state.

12. A method for assembling a connection arrangement for mechanically and fluidly connecting a fuel filter to a fluid meter in a fuel dispenser comprising a first part, a second part and a filter holding part along a common centre axis, wherein:
said first part comprises:
an outlet for fluid communication with an inlet of said fluid meter,
a first connection interface for mechanical connection to said fluid meter,
an inlet for fluid communication with the filter holding part, and
a second connection interface for mechanical connection to said second part;
said second part comprises:
a third connection interface for mechanical connection to said second connection interface, and
a fourth connection interface for mechanical connection to said filter holding part;
said filter holding part comprises:
an outlet for fluid connection to said inlet of said first part, and
a fifth connection interface for mechanical connection to said fourth connection interface;
said method comprising the steps of
connecting the third connection interface of the second part to the second connection interface of the first part,
connecting the filter holding part to a fuel supply pipe,
connecting the fifth connection interface of said filter holding part to the fourth connection interface of the second part by advancing the filter holding part into an opening formed through a sidewall of the second part in a direction toward the centre axis, establishing an unlocked state of said connection arrangement, in which said filter holding part is rotatable around said centre axis, and
adjusting the second part so as to press the filter holding part against the first part, thereby establishing a locked state in which projections extending from the filter holding part are seated in recesses formed in the first part so as to prevent rotation of the filtering holding part around said centre axis.

13. The method according to claim 12, wherein in the locked state, the filter holding part is pressed against the first part and the filter holding part has a sealed fluid connection to the first part.

14. The method according to claim 13, wherein said second connection interface is a circular cylinder section of said first part, and said third connection interface is a circular tubular section of the second part.

15. The method according to claim 12, wherein advancing the filter holding part into the opening includes moving the filter holding part in a horizontal direction, and adjusting the second part includes adjusting a vertical position of the second part.

16. A connection arrangement for mechanically and fluidly connecting a fuel filter to a fluid meter in a fuel dispenser, the connection arrangement comprising:
a first part;
a second part; and
a filter holding part, all of the first, second, and filter holding parts being connected along a common centre axis; wherein:
said first part comprises:
an outlet for fluid communication with an inlet of said fluid meter,
a first connection interface for mechanical connection to said fluid meter,
an inlet for fluid communication with the filter holding part, and
a second connection interface for mechanical connection to said second part;
said second part comprises:
a third connection interface for mechanical connection to said second connection interface, and
a fourth connection interface for mechanical connection to said filter holding part;
said filter holding parts comprises:
an outlet for fluid connection to said inlet of said first part, and
a fifth connection interface for mechanical connection to said fourth connection interface;
the second part is adjustable to move said connection arrangement between an unlocked state, in which said filter holding part is rotatable around said centre axis, and a locked state, in which the filter holding part is pressed directly against the first part and the filter holding part is prevented from rotating around said centre axis and has a sealed fluid connection to the first part;

the second part has an opening formed through a sidewall thereof, the filter holding part being configured to be advanced into the opening in a direction toward the centre axis so as to mechanically connect the fifth connection interface to the fourth connection interface;

the first part has recesses formed therein;

the filter holding part has projections extending therefrom; and in the locked state, the projections are seated in the recesses, thereby preventing rotation of the filter holding part from rotating around said centre axis.

17. The connection arrangement according to claim 16, wherein said second connection interface is a circular cylinder section of the first part, and said third connection interface is a circular tubular section of the second part.

18. The connection arrangement according to claim 16, wherein the fifth connection interface is a circular flange, and the fourth connection interface of the second part has the opening in a cylinder wall of the second part for receiving the flange, so that the flange is prevented from moving along said centre axis and so that the filter holding part is rotatable around said centre axis when said connection arrangement is in its unlocked state.

19. The connection arrangement according to claim 16, wherein the fourth connection interface includes a cylindrical sidewall, and the opening extends through the cylindrical sidewall.

20. The connection arrangement according to claim 16, wherein, when the connection arrangement is in the locked state, the projections and the recesses are visible from outside the connection arrangement through empty space defined by the opening.

* * * * *